United States Patent [19]
Goto et al.

[11] 3,919,982

[45] Nov. 18, 1975

[54] COMBUSTION CHAMBER OF A SPARK IGNITION ENGINE

[75] Inventors: Kenji Goto; Takao Niwa, both of Susono, Japan

[73] Assignee: Toyota Jidosha Kogyo Kabushiki Kaisha, Japan

[22] Filed: July 23, 1973

[21] Appl. No.: 381,518

[30] Foreign Application Priority Data
Mar. 21, 1973  Japan.............................. 48-39465

[52] U.S. Cl. ......... 123/32 E; 123/193 P; 123/32 A; 123/32 ST
[51] Int. Cl.² ..................... F02B 19/10; F02B 19/18
[58] Field of Search......... 123/193 P, 191 B, 191 C, 123/32 A, 32 E, 32 ST

[56] References Cited
UNITED STATES PATENTS

| | | | |
|---|---|---|---|
| 1,811,771 | 6/1931 | Wiemann | 123/32 E |
| 1,825,658 | 10/1931 | Dumanois | 123/32 E |
| 2,001,535 | 5/1935 | Lang | 123/32 E |
| 2,071,291 | 2/1937 | Thomas | 123/32 E |
| 2,248,989 | 7/1941 | Hanson | 123/191 C |
| 2,673,554 | 3/1954 | Thaheld | 123/32 E |
| 2,686,512 | 8/1954 | Beam | 123/193 P |
| 2,760,477 | 8/1956 | Bodine | 123/191 B |
| 3,132,633 | 5/1964 | Zimmerman | 123/193 P |
| 3,456,638 | 7/1969 | Bodine | 123/191 B |

Primary Examiner—Charles J. Myhre
Assistant Examiner—Ronald B. Cox
Attorney, Agent, or Firm—Stevens, Davis, Miller & Mosher

[57] ABSTRACT

An improved combustion chamber of a direct cylinder fuel injection type spark-ignition internal combustion engine, wherein a plurality of holes are provided in at least one of the upper face of a piston and the lower face of a cylinder head in a uniformly scattered fashion, and wherein a fuel injector is positioned to inject fuel into that portion of the combustion chamber which is remote from said holes, to thereby form a layer of a rich air-fuel mixture in that portion, while a contiguous layer of a lean air-fuel mixture is formed adjacent to said holes. The combustion chamber is so constructed as to ensure the minimized formation of nitrogen oxide and the complete combustion of uncombusted hydrocarbon and carbon monoxide during the operation of the engine.

6 Claims, 9 Drawing Figures

COMBUSTION CHAMBER OF A SPARK IGNITION ENGINE

This invention relates to improvements in the combustion chamber of a spark-ignition engine into which fuel is directly injected to form layers of air-fuel mixtures having different air-fuel ratios in the combustion chamber.

Forming layers of air-fuel mixtures having different air-fuel ratios in the combustion chamber of a spark-ignition engine has since a bit of time ago been proposed to accomplish a better combustion of the fuel in order to reduce the quantities of uncombusted hydrocarbon, carbon monoxide and nitrogen oxide exhausted to atmosphere. A number of systems have been devised for that purpose, as follows:

- A. Fuel is directly injected into a combustion chamber in such a manner as to form a layer of a rich air-fuel mixture in the vicinity of a spark plug, and the rich mixture is ignited to burn an adjacent layer of a lean mixture.
- B. An auxiliary chamber is attached to a main combustion chamber in communication therewith. Fuel is injected into the auxiliary chamber and ignited therein to burn an air-fuel mixture in the main chamber.
- C. Two carburetors are used to supply air-fuel mixtures having different air-fuel ratios into a single combustion chamber.
- D. An auxiliary chamber is attached to a main combustion chamber in communication therewith. A rich air-fuel mixture is supplied into the auxiliary chamber and ignited therein to burn a lean mixture in the main chamber.

All of these systems have, however, presented one or more of the following principal drawbacks:

1. Layer formation of air-fuel mixtures is not satisfactorily achieved immediately before the mixtures are ignited.
2. Engine power output is reduced as compared with an engine having a combustion chamber in which an air-fuel mixture is formed uniformly.
3. Complicated technique is required to regulate the supply of fuel or air-fuel mixtures to effect a proper layer formation.

With these points in mind, it is an object of this invention to provide an improved combustion chamber of a spark-ignition engine which is simple in construction and yet reliable in performance and which permits formation of layers of lean and rich air-fuel mixtures in a desired pattern without causing any appreciable output loss upon direct injection of fuel thereinto.

According to this invention, there is provided an improved combustion chamber structure of a direct cylinder fuel injection type spark-ignition engine which comprises a plurality of holes closed at the bottom thereof and formed in at least one of its associated piston and cylinder head on the side thereof facing the combustion chamber. These holes are formed to accommodate an extra amount of air defining a layer of a lean air-fuel mixture contiguous to a layer of a rich air-fuel mixture which is formed in the combustion chamber upon injection of fuel thereinto towards the end of the compression stroke of the engine. Thus, despite its very simple structure, the combustion chamber of this invention provides the following advantages, among others:

1. Combustion takes place uniformly throughout the combustion chamber as air flows thereinto from the holes in the piston head and/or the cylinder head with the descent of the piston during the expansion stroke of the engine.
2. The holes increase the effective surface area of the combustion chamber to a considerable extent and improve the thermal conductivity of the engine accordingly. At the same time, the peak pressure of combustion gas toward top dead center is reduced, so that the flame temperature is considerably lowered. These factors cooperate with the primary combustion of the rich air-fuel mixture to reduce the quantity of nitrogen oxide exhausted to atmosphere.
3. A high thermal efficiency is obtained even when the overall air-fuel ratio of the mixtures throughout the cylinder is chosen in the neighborhood of a theoretically optimum value.
4. Uncombusted hydrocarbon and carbon monoxide are burned during the expansion stroke to produce an additional output.

The foregoing and other objects, features and advantages of this invention will become apparent from the following description, and the accompanying drawings, in which.

Figure 1:
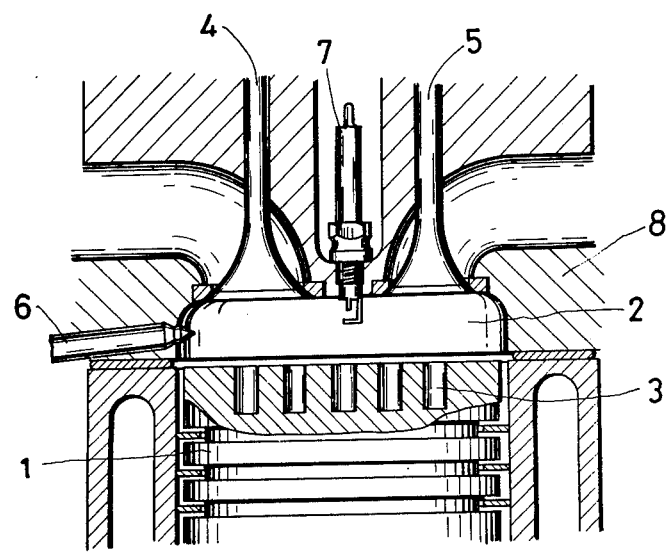
FIG. 1 is a vertical sectional view showing a preferred embodiment of this invention in which a fuel injector is mounted on a cylinder head.
Figure 2A:
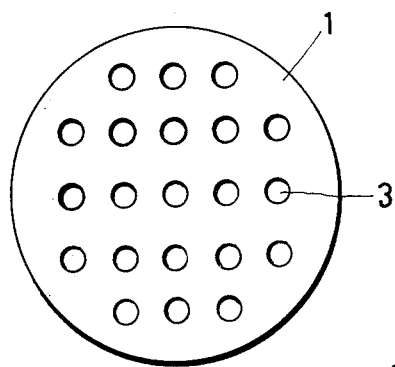
FIG. 2(a) is a schematical plan view of a piston constructed in accordance with the principles of this invention.
Figure 2B:
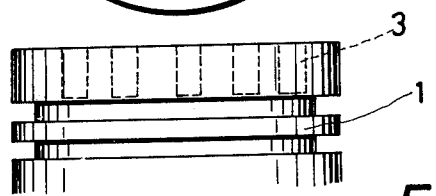
FIG. 2(b) is a fragmentary front elevational view of the piston shown in FIG. 2(a)
Figure 5:
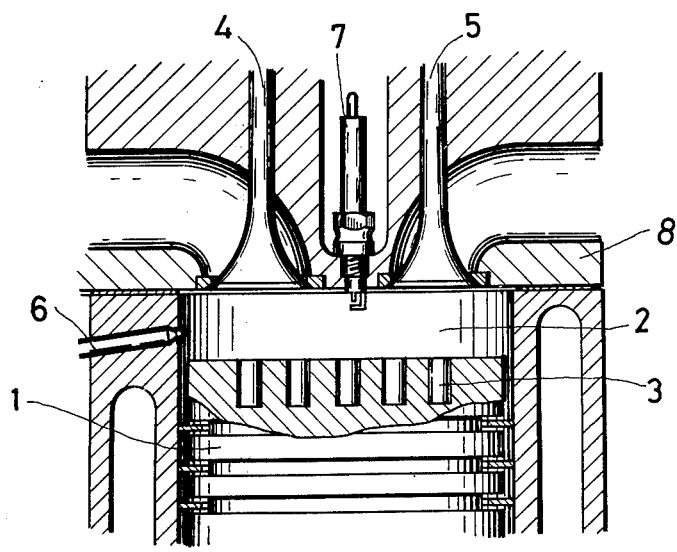
FIG. 5 is a vertical sectional view showing a modified form of the combustion chamber shown in FIG. 1 in which a fuel injector is mounted on a cylinder.

Referring now to FIGS. 1, 2 and 5 of the drawings showing a first preferred embodiment of this invention and a modified form thereof, a piston 1 of a direct cylinder fuel injection type spark-ignition internal combustion engine is provided with a plurality of uniformly scattered holes 3 closed at the bottom thereof and formed in the upper end portion of the piston 1 defining the bottom of a combustion chamber 2. An inlet valve 4 and an exhaust valve 5 are provided at the top of the combustion chamber 2 defined by the inner surface of a cylinder head. A fuel injector 6 is mounted on the cylinder head 8 (FIG. 1) or a cylinder (FIG. 5) and positioned slantingly to inject fuel into the combustion chamber 2 in an upward direction relative to the top plane of the cylinder. A spark plug 7 is mounted in the cylinder head and the electrode thereof extends into the combustion chamber 2. It will be noted that the fuel injector 6 is directed toward the spark gap of the electrode of the spark plug 7, so that the fuel may be injected toward the spark gap of the spark plug 7.

Air is introduced into the combustion chamber 2 through the inlet valve 4 during the intake stroke of the engine. Fuel is injected into the combustion chamber 2 through the fuel injector 6 toward the end of the compression stroke. It will be observed that since the fuel is injected toward a portion of the combustion chamber 2 remote from the piston 1, it will not get into the holes 3 and be mixed with the air residing therein, so that the fuel injected into the combustion chamber 2 may form a layer of a rich air-fuel mixture having a considerably large proportion of fuel. This layer of the rich mixture clearly defines therebelow a contiguous layer of a lean mixture comprising the air residing in the holes 3 of the piston 1. The spark gap of the spark plug 7 is located in the area in which the layer of the rich fuel mixture is formed, so that the rich fuel mixture in the vicinity of the spark plug 7 is easily ignited.

With the descent of the piston 1 during the expansion stroke of the engine, the air residing in the holes 3 flows into the combustion chamber 2 and causes combustion of uncombusted hydrocarbon and carbon monoxide. The energy generated by the combustion of the uncombusted hydrocarbon and carbon monoxide is partly recovered as an additional engine output. Since the outlets of the holes 3 are not so shaped as to produce any throttling effect on the air flowing out therefrom, the air flowing out from the holes 3 into the combustion chamber 2 does not produce any vortical or turbulent flow. Moreover, as the holes 3 are uniformly scattered all over the end surface of the piston 1, the air is allowed to flow uniformly into virtually any portion of the combustion chamber 2. Accordingly, combustion of the fuel is quite uniformly accomplished in any portion of the combustion chamber 2 during the expansion stroke of the engine. Furthermore, a turbulent flow of air is minimized due to the configuration and arrangement of the holes 3 as described and shown, when air flows in the opposite direction from the combustion chamber 2 into the holes 3 during the compression stroke of the engine.

Therefore, it will be seen that according to this invention, a vortical or turbulent flow of air in the combustion chamber 2 can be minimized or virtually prevented throughout the compression and expansion strokes of the engine, so that there will not develop any disorder in the layer of a rich air-fuel mixture formed upon injection of fuel into the combustion chamber 2 in the vicinity of the spark gap of the spark plug 7. Combustion takes place and continues in the layer of the rich air-fuel mixture for some time after the spark plug is actuated for ignition, so that the flame is maintained at a relatively low temperature, thereby decreasing the quantity of nitrogen oxide formed by combustion. With the descent of the piston during the expansion stroke, air flows out of the holes 3 uniformly into the combustion chamber without disturbing the layers of the air-fuel mixtures therein, and ensures the complete combustion of uncombusted hydrocarbon and carbon monoxide.

As they do not have any throttling portion of their outlets, the holes 3 hardly present any trouble in the withdrawal of the residue exhaust gas therefrom during the scavenging of the cylinder during the valve overlap period from the exhaust stroke to the intake stroke of the engine.

Furthermore, the effective inner surface area of the combustion chamber 2 enlarged by the provision of the holes 3 increases the thermal conductivity of the combustion chamber, resulting in a lower flame temperature and hence the minimum formation of nitrogen oxide.

Figure 3:
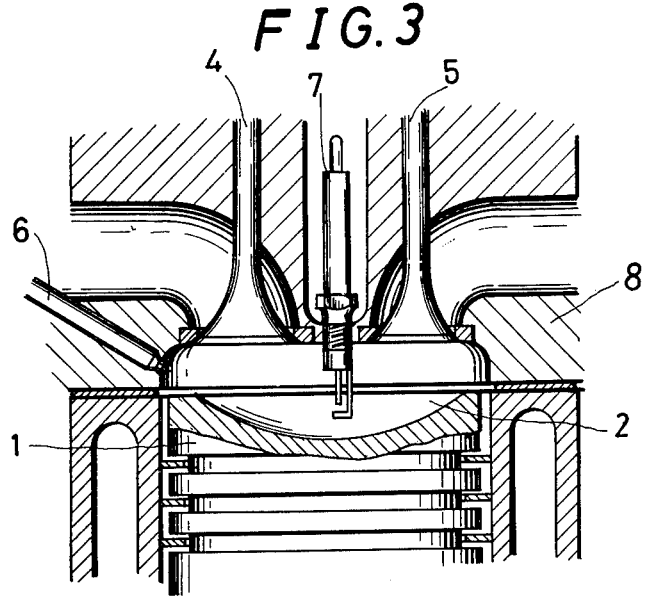
FIG. 3 is a vertical sectional view showing another preferred embodiment of this invention in which a fuel injector is mounted on a cylinder head.
Figure 4:
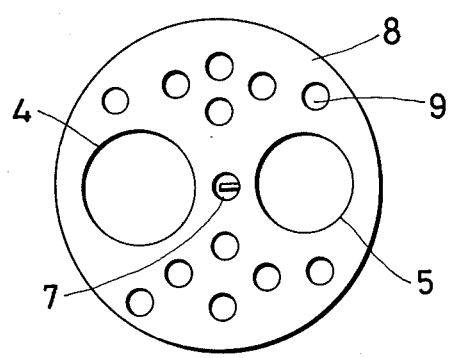
FIG. 4 is a bottom view of the upper wall of the combustion chamber shown in FIG. 3.
Figure 6:
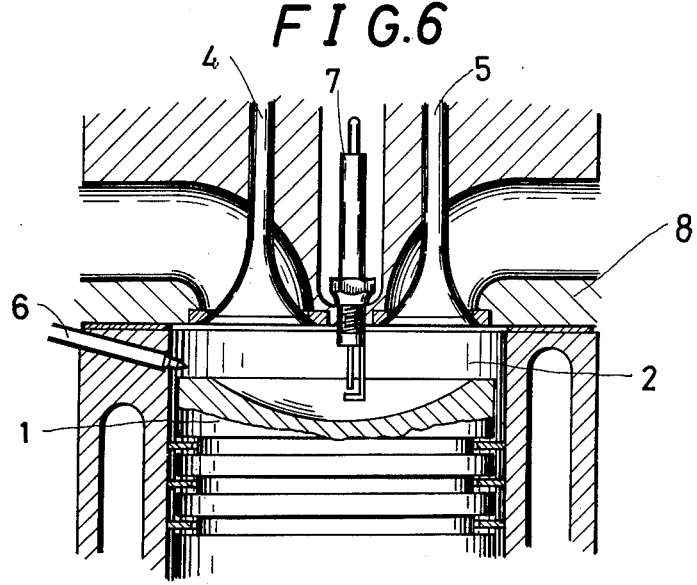
FIG. 6 is a vertical sectional view showing a modified form of the structure shown in FIG. 3 in which a fuel injector is mounted on a cylinder.

Attention is now directed to FIGS. 3, 4 and 6 of the drawings which illustrate a second preferred embodiment of this invention and a modified form thereof. A particular feature of this embodiment lies in the provision of a plurality of holes 9 in that portion of the cylinder head 8 which defines the upper extremity of the combustion chamber 2, instead of providing them in the head of the piston 1. The upper end of the piston 1 which defines the lower extremity of the combustion chamber 2 is preferably formed with a bowl-like concavity, and the spark gap of the spark plug 7 extends into that concavity. The fuel injector 6 is mounted on the cylinder head 8 (FIG. 3) or the cylinder (FIG. 6) and directed toward the upper end of the piston 1. Accordingly, the fuel injected into the combustion chamber 2 through the injector 6 toward the end of the compression stroke is directed into the lower portion of the chamber 2 remote from the holes 9 and does not get mixed with the air residing in the holes 9. Thus, a layer of a rich air-fuel mixture is formed in the lower portion of the combustion chamber 2, while a layer of a lean mixture is formed in the upper portion of the chamber 2 adjacent to the holes 9. Since the spark gap of the spark plug 7 is located in the lower portion of the combustion chamber 2, the fuel injected thereinto is easily ignited, and since the holes 9 are uniformly scattered over the top wall of the combustion chamber 2 as shown in FIG. 4, the air residing in the holes 9 flows down into the chamber 2 and assists uniform combustion with the descent of the piston 1 during the exapansion stroke of the engine. Other features and advantages duplicate those of the first preferred embodiment as hereinbefore described.

Figure 7:
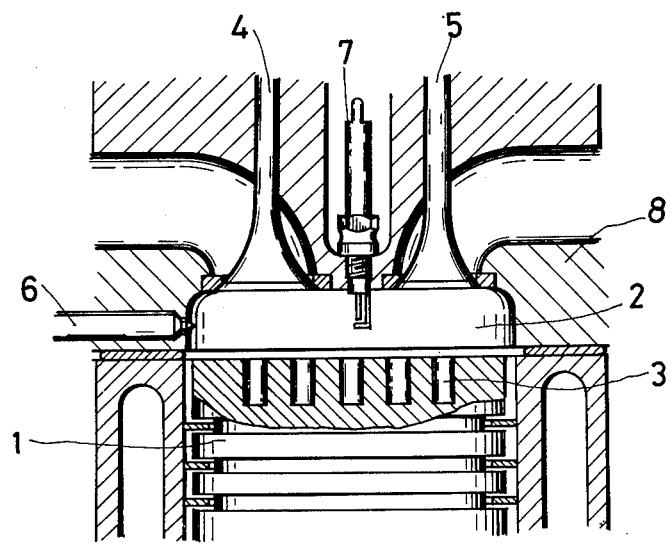
FIG. 7 is a vertical sectional view showing still another preferred embodiment of this invention.
Figure 8:
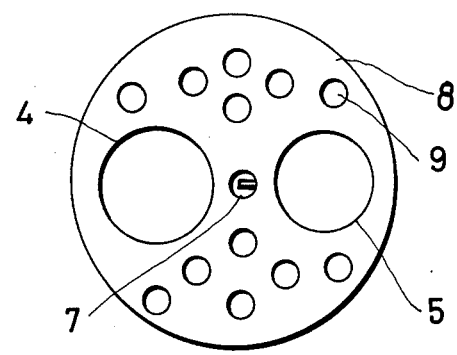
FIG. 8 is a bottom view of the upper wall of the combustion chamber shown in FIG. 7.

A third preferred embodiment of this invention is illustrated in FIGS. 7 and 8 and is featured by the provision of closed-bottom holes in both the piston 1 and the cylinder head 8, i.e., at both the upper and lower extremities of the combustion chamber 2. The holes 9 provided in the cylinder head 8 are arranged as shown in FIG. 8, while the holes 3 formed in the piston 1 are positioned in a like manner to the first preferred embodiment as shown in FIG. 2, so that the hole arrangement of this third preferred embodiment represents a combination of the first and second preferred embodiments as illustrated in FIGS. 2 and 4, respectively. The fuel injector 6 is mounted on the cylinder head 8 or the cylinder and positioned substantially in a horizontal plane perpendicular to the side wall of the cylinder so as to inject fuel into a portion of the combustion chamber 2 intermediate the upper and lower extremities thereof, so that a layer of a rich air-fuel mixture is formed intermediate the upper and the lower extremities of the combustion chamber 2. The spark plug 7 is mounted in such a manner that its spark gap is located in a position intermediate the upper and the lower extremities of the combustion chamber 2 to ensure quick ignition of the fuel-air mixture formed upon injection of fuel in the vicinity of the spark gap of the spark plug 7. Air flows out from the upper and the lower holes 9 and 3 into the combustion chamber 2 with the descent of the piston 1 during the expansion stroke and ensures uniform combustion throughout the combustion chamber 2. Other features and advantages duplicate those of the first and second preferred embodiments as hereinbefore described.

While the invention has been described with reference to some preferred embodiments thereof, it is to be understood that variations or modifications may be made by those skilled in the art without departing from the scope of the invention which is defined by the appended claims.

What is claimed is:

1. In the combustion chamber, of a direct fuel injection type spark-ignition internal combustion engine, defined by and between the face of a piston facing a cylinder head and the face of the cylinder head facing the piston, the improvement comprising:
   a plurality of uniformly scattered holes in at least one of said piston and cylinder head, each of said holes opening at one end thereof into said chamber and the other end thereof being closed, said holes being adapted to receive air therein upon introduction of air into said chamber, the cross-sectional area of the open end of said holes being no smaller than that of the closed end thereof to let out the air therefrom without causing turbulence in said chamber upon movement of said piston away from said cylinder head; a fuel injector for injecting fuel into a portion of said chamber relatively remote from said holes whereby fuel is prevented from entering said holes; and a spark plug, the spark gap of which is located in said portion of said chamber.

2. A direct fuel injection spark-ignition internal combustion engine comprising:
   a cylinder, a cylinder head for said cylinder,
   a piston in said cylinder,
   a combustion chamber defined by and between the face of said piston facing said cylinger head and the face of said cylinder head facing said piston,
   a plurality of uniformly scattered holes in at least one of said piston and said cylinder head, each of said holes opening at one end thereof into said chamber and the other end thereof being closed, said holes being adapted to receive air therein upon introduction of air into said chamber, the cross-sectional area of the open end of each of said holes being no smaller than that of the closed end thereof to let out the air therefrom without causing turbulence in said chamber upon movement of said piston away from said cylinder head,
   a fuel injector for injecting fuel into a portion of said chamber relatively remote from said holes whereby fuel is prevented from entering said holes, and
   a spark plug, the spark gap of which is located in said portion of said chamber.

3. The internal combustion engine as claimed in claim 2 wherein:
   said holes are of constant depth and of the same diameter.

4. The internal combustion engine as claimed in claim 2 wherein:
   said holes are in said piston and are scattered over substantially the entire area of said face of said piston.

5. The internal combustion engine as claimed in claim 2 wherein:
   said holes are in said cylinder head, an inlet valve opening in said cylinder head, an exhaust valve opening in said cylinder head, and said holes are scattered over substantially the entire area of said face of cylinder head other than the area containing said openings.

6. The internal combustion engine as claimed in claim 5 wherein:
   each opening is of a diameter substantially larger than the cross-sectional area of each of said holes.

* * * * *

UNITED STATES PATENT AND TRADEMARK OFFICE
CERTIFICATE OF CORRECTION

PATENT NO. : 3,919,982
DATED : November 18, 1975
INVENTOR(S) : Kenji GOTO et al

It is certified that error appears in the above-identified patent and that said Letters Patent are hereby corrected as shown below:

[30] delete "Mar. 21, 1973" and insert -- Mar. 31, 1973 --.
Column 4, line 34, delete "exapansion" and insert
    -- expansion --.
Column 5, line 34, delete "cylinger" and insert -- cylinder --.

Signed and Sealed this twenty-fourth Day of February 1976

[SEAL]

Attest:

RUTH C. MASON
Attesting Officer

C. MARSHALL DANN
Commissioner of Patents and Trademarks